(12) United States Patent
Shimizu et al.

(10) Patent No.: US 11,401,432 B2
(45) Date of Patent: Aug. 2, 2022

(54) CURABLE COMPOSITION, ACCOMMODATING UNIT, DEVICE FOR FORMING TWO OR THREE DIMENSIONAL IMAGE, METHOD OF FORMING TWO OR THREE DIMENSIONAL IMAGE, AND CURED MATTER

(71) Applicant: RICOH COMPANY, LTD., Tokyo (JP)

(72) Inventors: Takayuki Shimizu, Kanagawa (JP); Satoshi Kojima, Kanagawa (JP); Hiroki Kobayashi, Kanagawa (JP); Shin Hasegawa, Tokyo (JP); Yuuki Matsushita, Kanagawa (JP); Yukiko Ishijima, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 266 days.

(21) Appl. No.: 16/745,546

(22) Filed: Jan. 17, 2020

(65) Prior Publication Data
US 2020/0231832 A1   Jul. 23, 2020

(30) Foreign Application Priority Data
Jan. 22, 2019  (JP) ............................. JP2019-008187

(51) Int. Cl.
| | | |
|---|---|---|
| *C09D 11/38* | (2014.01) | |
| *C08L 33/10* | (2006.01) | |
| *B41J 2/21* | (2006.01) | |
| *B41M 7/00* | (2006.01) | |
| *C08K 5/5397* | (2006.01) | |

(52) U.S. Cl.
CPC ............. *C09D 11/38* (2013.01); *B41J 2/2107* (2013.01); *B41M 7/0081* (2013.01); *C08K 5/5397* (2013.01); *C08L 33/10* (2013.01)

(58) Field of Classification Search
CPC ......... C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41J 2/04588; B41J 2/04595; B41J 2/04586; B41J 2/14274; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 9,453,135 B2 * | 9/2016 | Andre .................... | B41J 2/2114 |
| 2006/0036001 A1 * | 2/2006 | Oyanagi .............. | C09D 11/101 523/160 |
| 2007/0081063 A1 * | 4/2007 | Nakano .................. | C09D 11/40 347/100 |
| 2008/0081119 A1 * | 4/2008 | Oyanagi .............. | C09D 11/101 427/385.5 |
| 2011/0045184 A1 * | 2/2011 | Kakino ................ | C09D 11/101 427/256 |
| 2011/0183081 A1 | 7/2011 | Nakane et al. | |
| 2011/0223391 A1 * | 9/2011 | Nishimura ............. | C09D 11/36 428/195.1 |
| 2012/0162308 A1 | 6/2012 | Mochizuki et al. | |
| 2015/0064398 A1 * | 3/2015 | Umebayashi .......... | C09D 11/40 428/137 |
| 2017/0104547 A1 * | 4/2017 | Kerselaers ............. | H04W 4/80 |
| 2017/0240754 A1 * | 8/2017 | Tsuchiya .................... | B41J 2/01 |
| 2017/0253680 A1 | 9/2017 | Yamada | |
| 2017/0260405 A1 | 9/2017 | Kumai et al. | |
| 2017/0267879 A1 | 9/2017 | Kohzuki et al. | |
| 2017/0291431 A1 * | 10/2017 | Nakano .................. | B41J 2/2114 |
| 2017/0327705 A1 * | 11/2017 | Yamada ............... | C09D 11/101 |
| 2018/0170061 A1 | 6/2018 | Nakamura et al. | |
| 2018/0208783 A1 | 7/2018 | Takahashi et al. | |

(Continued)

FOREIGN PATENT DOCUMENTS

| | | |
|---|---|---|
| CN | 102134418 | 7/2011 |
| CN | 102558951 | 7/2012 |

(Continued)

OTHER PUBLICATIONS

Chinese Office Action dated Aug. 25, 2021 in Chinese Application No. 202010052433.7.

*Primary Examiner* — Manish S Shah
(74) *Attorney, Agent, or Firm* — Grüneberg and Myers PLLC

(57) ABSTRACT

A curable composition contains a polymerizable compound and a polymerization initiator containing pheylbis(2,4,6-trimethyl benzoyl)phosphine oxide and diphenyl(2,4,6-trimethylbenzoyl)phosphine oxide in a mass ratio of pheylbis(2,4,6-trimethyl benzoyl)phosphine oxide:diphenyl(2,4,6-trimethylbenzoyl)phosphine oxide from 1:6 to 1:160, wherein supernatant obtained after the curable composition is centrifuged for 30 minutes at 70,000 rotation per minute has an absorbance of 0.02 or less at a wavelength of 700 nm.

15 Claims, 2 Drawing Sheets

(56) References Cited

U.S. PATENT DOCUMENTS

| | | |
|---|---|---|
| 2018/0333909 A1 | 11/2018 | Arita et al. |
| 2019/0023924 A1 | 1/2019 | Yamada |
| 2019/0071581 A1 | 3/2019 | Yoshikawa et al. |
| 2019/0100667 A1 | 4/2019 | Miyaake et al. |
| 2019/0256727 A1 | 8/2019 | Kumai et al. |
| 2019/0270901 A1 | 9/2019 | Fujii et al. |
| 2019/0270903 A1 | 9/2019 | Kohzuki et al. |
| 2019/0284416 A1 | 9/2019 | Asami et al. |
| 2019/0300731 A1 | 10/2019 | Nagashima et al. |
| 2020/0010662 A1 | 1/2020 | Hiraoka et al. |

FOREIGN PATENT DOCUMENTS

| | | |
|---|---|---|
| CN | 108884345 | 11/2018 |
| JP | 2016-183344 | 10/2016 |
| JP | 2018-154766 | 10/2018 |

\* cited by examiner

CURABLE COMPOSITION, ACCOMMODATING UNIT, DEVICE FOR FORMING TWO OR THREE DIMENSIONAL IMAGE, METHOD OF FORMING TWO OR THREE DIMENSIONAL IMAGE, AND CURED MATTER

CROSS-REFERENCE TO RELATED APPLICATIONS

This patent application is based on and claims priority pursuant to 35 U.S.C. § 119 to Japanese Patent Application No. 2019-008187, filed on Jan. 22, 2019, in the Japan Patent Office, the entire disclosure of which is hereby incorporated by reference herein.

BACKGROUND

Technical Field

The present invention relates to a curable composition, an accommodating unit, a device for forming a two or three dimensional image, a method of forming a two or three dimensional image, and cured matter.

Description of the Related Art

To use a curable ink composition in inkjet recording, a recording head, etc. is generally filled with the curable ink composition and discharges it from a nozzle of the recording head. Such a curable ink composition is usually prepared by mixing and stirring raw materials followed by filtration. If the raw material contains a large amount of impurities or components insoluble in a polymerizable compound during mixing and stirring the raw materials, the impurities or insoluble components cannot be removed but remain in the curable ink composition even after the filtration, which may degrade discharging stability. Therefore, the quality of the curable ink composition and the solubility of the polymerizable compound and the raw materials must be considered.

SUMMARY

According to embodiments of the present disclosure, provided is a curable composition which contains a polymerizable compound and a polymerization initiator containing pheylbis(2,4,6-trimethyl benzoyl)phosphine oxide and diphenyl(2,4,6-trimethylbenzoyl)phosphine oxide in a mass ratio of pheylbis(2,4,6-trimethyl benzoyl)phosphine oxide: diphenyl(2,4,6-trimethylbenzoyl)phosphine oxide from 1:6 to 1:160, wherein supernatant obtained after the curable composition is centrifuged for 30 minutes at 70,000 rotation per minute has an absorbance of 0.02 or less at a wavelength of 700 nm.n

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
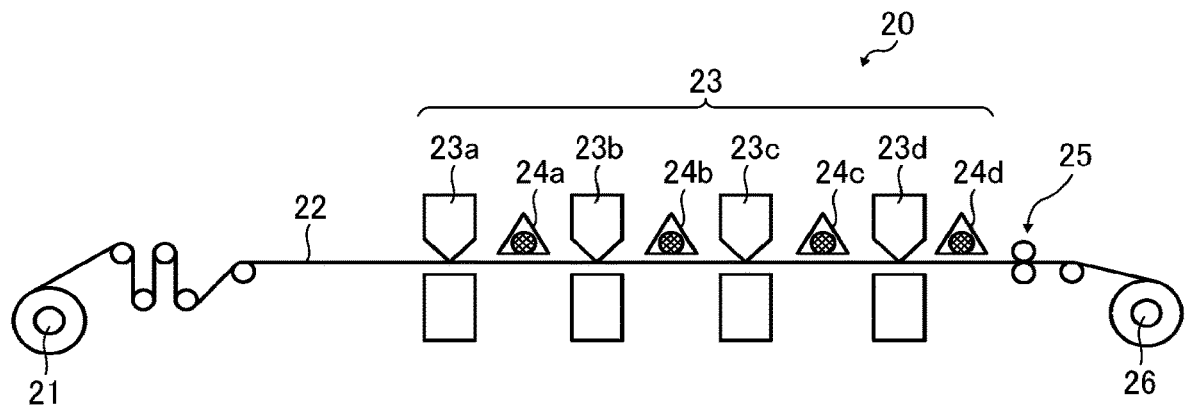
FIG. 1 is a schematic diagram illustrating an example of a device for forming an image including an inkjet discharging device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a curable composition having excellent curability and a high level of discharging stability can be provided.

In order to improve the curability of the curable ink composition, a large amount of a polymerization initiator is added. However, depending on the type of the polymerizable compound, the polymerization initiator may not be dissolved. Further, when a large amount of a polymerization initiator is added in order to improve curability, impurities contained in the polymerization initiator increases and discharging stability deteriorates.

For example, in an active energy ray-curable ink composition having a small change in viscosity over time, diphenyl (2,4,6-trimethylbenzoyl)phosphine oxide (DAIDO UV-CURE TPO, manufactured by Daido Chemical Industry Co., Ltd.) is used as a polymerization initiator in Examples of JP-2018-154766-A1.

Curable Composition

The curable composition of the present disclosure includes a polymerizable compound and a polymerization initiator containing pheylbis(2,4,6-trimethyl benzoyl)phosphine oxide and diphenyl(2,4,6-trimethylbenzoyl)phosphine oxide in a mass ratio of pheylbis(2,4,6-trimethyl benzoyl) phosphine oxide:diphenyl(2,4,6-trimethylbenzoyl)phosphine oxide from 1:6 to 1:160, wherein supernatant obtained after the curable composition is centrifuged for 30 minutes at 70,000 rotation per minute (rpm) has an absorbance of 0.02 or less at a wavelength of 700 nm. The curable composition may furthermore optionally include other components.

In typical technologies, there is no mention or suggestion that pheylbis(2,4,6-trimethyl benzoyl)phosphine oxide and diphenyl(2,4,6-trimethylbenzoyl)phosphine oxide are used in combination as a polymerization initiator with a predetermined ratio and are effective to obtain a curable composition having excellent curability and a high level of discharging stability.

Supernatant obtained by centrifuging the curable composition of the present disclosure at 70,000 rpm for 30 minutes has an absorbance of 0.02 or less at a wavelength of 700 nm. When the absorbance of the supernatant liquid at a wavelength of 700 nm is 0.02 or less, the curable composition contains few insoluble components (foreign matter), so that the discharging stability is improved.

The absorbance of the supernatant is measured as follows: the prepared curable composition is subject to centrifuging at 70,000 rpm for 30 minutes first using a centrifuge (CP-100MX, manufactured by Hitachi Koki Co., Ltd.) to collect supernatant and the absorbance thereof is measured at 700 nm using an absorbance meter (U-3900H, manufactured by Hitachi High-Technologies Corporation).

As the curable composition of the present disclosure, a thermocurable composition, an active energy ray curable composition, etc., can be used. Of these, the active energy ray curable composition is more suitable.

Polymerizable Compound

Examples of the polymerizable compound include, but are not limited to, a monofunctional monomer, a polyfunctional monomer, and a polymerizable oligomer.

Monofunctional Monomer

The monofunctional monomer is not particularly limited and can be suitably selected to suit to a particular application.

Specific examples include, but are not limited to, phenoxyethyl (meth)acrylate, tetrahydrofurfuryl (meth)acrylate, isobornyl (meth)acrylate, 2-hydroxyethyl (meth)acrylate, 4-hydroxybutyl (meth)acrylate, isobutyl (meth)acrylate, t-butyl (meth)acrylate, isooctyl (meth)acrylate, 2-methoxyethyl (meth)acrylate, methoxytriethylene glycol (meth)acrylate, 2-ethoxyethyl (meth)acrylate, 3-methoxybutyl (meth)acrylate, ethoxyethyl (meth)acrylate, butoxyethyl (meth)acrylate, ethoxydiethylene glycol (meth)acrylate, 2-hydroxyethyl (meth)acrylate, ethyl diglycol (meth)acrylate, cyclic trimethylolpropane formal mono(meth)acrylate, imide (meth)acrylate, isoamyl (meth)acrylate, ethoxylated succinic acid (meth)acrylate, trifluoroethyl (meth)acrylate, ω-carboxypolycaprolactone mono(meth)acrylate, benzyl (meth)acrylate, methylphenoxyethyl (meth)acrylate, cyclohexyl (meth)acrylate, 4-t-butylcyclohexyl (meth)acrylate, caprolactone-modified tetrahydrofurfuryl (meth)acrylate, tribromophenyl (meth)acrylate, ethoxylated tribromophenyl (meth)acrylate, 2-phenoxyethyl (meth)acrylate, (meth)acryloyl morpholine, phenoxydiethylene glycol (meth)acrylate, 2-hydroxy-3-phenoxypropyl (meth)acrylate, 1,4-cyclohexanedimethano mono(meth)acrylate, 2-(2-ethoxyethoxy) ethyl (meth)acrylate, stearyl (meth)acrylate, diethylene glycol monobutyl ether (meth)acrylate, lauryl (meth)acrylate, isodecyl (meth)acrylate, 3,3,5-trimethylcyclohexanol (meth)acrylate, isooctyl (meth)acrylate, octyl/decyl (meth) acrylate, tridecyl (meth)acrylate, caprolactone (meth)acrylate, ethoxylated (4) nonylphenol (meth)acrylate, methoxypolyethylene glycol (350) mono(meth)acrylate, methoxypolyethylene glycol (550) mono(meth)acrylate, N-vinylformamide, N-vinylcaprolactam, and vinylpyrrolidone. These can be used alone or in combination.

Of these, (meth)acryloyl morpholine, cyclic trimethylolpropane formal (meth)acrylate, and phenoxyethyl (meth) acrylate are preferable in terms of enhancing solubility of a polymerization initiator and attachability to a substrate.

The polymerizable compound preferably contains at least one member selected from the group consisting of (meth) acryloylmorpholine, cyclic trimethylolpropane formal (meth)acrylate, and phenoxyethyl (meth)acrylate in an amount of 40 percent by mass or more and more preferably 50 percent by mass or more.

When the proportion of at least one member selected from the group consisting of (meth)acryloylmorpholine, cyclic trimethylolpropane formal (meth)acrylate, and phenoxyethyl (meth)acrylate is 40 percent by mass or more, the polymerization initiator is sufficiently dissolved and the attachability can be improved.

In Examples, which are described later, isobornyl (meth) acrylate was used as a monofunctional monomer in terms of wet spreading and enhancement of image quality. However, isobornyl (meth)acrylate does not dissolve a polymerization initiator well. Therefore, if the proportion of isobornyl (meth)acrylate is too large, the polymerization initiator becomes insoluble, and the insoluble matter may adversely affect the discharging stability. Therefore, the proportion of isobornyl (meth)acrylate is preferably 30 percent by mass or less, more preferably 20 percent by mass or less, and furthermore preferably 10 percent by mass or less.

Polyfunctional Monomer

The polyfunctional monomer has two or more ethylenically unsaturated double bonds.

Specific examples include, but are not limited to, tricyclododecane dimethylol di(meth)acrylate, hexamethylene di(meth)acrylate, trimethylol propane tri(meth)acrylate, pentaerythritol tri(meth)acrylate, pentaerythritol tetra(meth) acrylate, ethylene glycol di(meth)acrylate, polyethylene glycol di(meth)acrylate, tetraethylene glycol di(meth)acrylate, dipropylene glycol di(meth)acrylate, tripropylene glycol tri (meth)acrylate, polypropylene glycol di(meth)acrylate, neopentyl glycol di(meth)acrylate, bispentaerythritol hexa(meth)acrylate, diethylene glycol di(meth)acrylate, 1,6-hexanediol di(meth)acrylate, ethoxylated 1,6-hexanediol di(meth)acryle, 1,4-butanediol di(meth)acrylate, 1,9-nonanediol di(meth)acrylate, 2-n-butyl-2-ethyl-1,3-propanediol di(meth)acrylate, neopentyl glycol di(meth)acrylate hydroxypivalate, trimethylolpropane tri(meth)acrylate hydroxypivalate, 1,3-butylene glycol di(meth)acrylate, ethoxylated tri(meth)acrylate phosphate, ethoxylated tripropylene glycol di(meth)acrylate, neopentyl glycol-modified trimethylolpropane di(meth)acrylate, stearic acid-modified pentaerythritol di(meth)acrylate, tetramethylolmethane tri (meth)acrylate, tetramethylol methane tetra(meth)acrylate, tetramethylol propane tri(meth)acrylate, caprolactone-modified trimethylolpropane tri(meth)acrylate, propoxylate glyceryl tri(meth)acrylate, ditrimethylol propane tetra(meth) acrylate, ethoxylated pentaerythritol tetra(meth)acrylate, dipentaerythritol hexa(meth)acrylate, caprolactone-modified dipentaerythritol hexa(meth)acrylate, dipentaerythritol hydroxypenta (meth)acrylate, neopentyl glycol oligo(meth) acrylate, 1,4-butanediol oligo(meth)acrylate, 1,6-hexanediol oligo(meth)acrylate, trimethylolpropane oligo(meth)acrylate, pentaerythritol oligo(meth)acrylate, ethoxylated neopentyl glycol di(meth)acrylate, propoxylated neopentyl glycol di(meth)acrylate, tripropylene glycol di(meth)acrylate, ethoxylated trimethylolpropane tri(meth)acrylate, and propoxylated trimethylolpropane tri(meth)acrylate. These can be used alone or in combination.

The proportion of the polyfunctional monomer including the polyfunctional oligomer, which is described later, is preferably from 0.01 to 20 percent by mass and more preferably from 5 to 15 percent by mass to the total content of the curable composition. When the proportion is within this range, a cured product with good attachability and sufficient hardness can be obtained.

Polymerizable Oligomer

The polymerizable oligomer has an ethylenically unsaturated double bond. Examples include, but are not limited to, an aromatic urethane oligomer, an aliphatic urethane oligomer, an epoxy acrylate oligomer, a polyester acrylate oligomer, and other special oligomers.

The polymerizable oligomer is available on the market.

Specific examples include, but are not limited to, UV-2000B, UV-2750B, UV-3000B, UV-3010B, UV-3200B, UV-32000B, and UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 (all manufactured by The Nippon Synthetic Chemical Industry Co., Ltd.), CN902, CN902J75, CN929, CN940, CN944, CN944B85, CN959, CN961E75, CN961H81, CN962, CN963, CN963A80, CN963B80, CN963E75, CN963E80, CN963J85, CN964, CN965, CN965A80, CN966, CN966A80, CN966B85, CN966H90, CN966J75, CN968, CN969, CN970, CN970A60, CN970E60, CN971, CN971A80, CN971J75, CN972, CN973, CN973A80, CN973H85, CN973J75, CN975, CN977, CN977C70, CN978, CN980, CN981, CN981A75, CN981B88, CN982, CN982A75, CN982B88, CN982E75, CN983, CN984, CN985, CN985B88, CN986, CN989, CN991, CN992, CN994, CN996, CN997, CN999, CN9001, CN9002, CN9004, CN9005, CN9006, CN9007, CN9008, CN9009, CN9010, CN9011, CN9013, CN9018, CN9019, CN9024, CN9025, CN9026, CN9028, CN9029, CN9030, CN9060, CN9165, CN9167, CN9178, CN9290, CN9782, CN9783, CN9788, and CN9893 (all manufactured by Sartomer Company), EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 (all manufactured by Daicel Cytec). These can be used alone or in combination.

The proportion of the polymerizable oligomer to the total mass of the curable composition is preferably from 0.01 to 15 percent by mass and more preferably from 1 to 10 percent by mass. When the proportion is from 0.01 to 15 percent by mass, a cured product with good attachability and sufficient hardness can be obtained.

Polymerization Initiator

The curable composition of the present disclosure may contain a polymerization initiator. In addition, the polymerization initiator is also simply referred to as an initiator. Examples of the polymerization initiator include, but are not limited to, thermal polymerization initiators and photopolymerization initiators.

The photopolymerization initiator produces active species such as a radical or a cation upon an application of energy of active energy rays and initiates polymerization of a polymerizable compound (monomer or oligomer). As the polymerization initiator, it is suitable to use a known radical polymerization initiator, a cation polymerization initiator, a base producing agent, or a combination thereof. Of these, radical polymerization initiators are preferable.

Moreover, the polymerization initiator preferably accounts for 5 to 20 percent by mass of the total content of the curable composition to obtain sufficient curing speed.

Specific examples of the radical polymerization initiators include, but are not limited to, aromatic ketones, acylphosphineoxide compounds, aromatic oniumchlorides, organic peroxides, thio compounds (thioxanthone compounds, compounds including thiophenyl groups, etc.), hexaarylbiimidazole compounds, ketoxime-esterified compounds, borate compounds, azinium compounds, metallocene compounds, active ester compounds, compounds having a carbon halogen bond, and alkylamine compounds. These can be used alone or in combination.

Of these, phenylbis(2,4,6-trimethylbenzoyl)phosphine oxide and diphenyl(2,4,6-trimethylbenzoyl)phosphine oxide as acylphosphine oxide compound are preferable.

The mass ratio (X:Y) of the content of the phenylbis(2,4,6-trimethylbenzoyl)phosphine oxide (X) and the content of the diphenyl(2,4,6-trimethylbenzoyl)phosphine oxide (Y) is preferably from 1:6 to 1:160 and more preferably from 1:8 to 1:120 to obtain a sufficient curing speed and discharging stability. When the mass ratio (X:Y) is less than 1:6, the proportion of the polymerization initiator is so small that sufficient curability may not be obtained. Conversely, when the mass ratio (X:Y) is more than 1:160, the proportion of the polymerization initiator may be excessive, which degrades discharging stability.

As phenylbis(2,4,6-trimethylbenzoyl)phosphine oxide, commercially available products can be used.

Specific examples include, but are not limited to, phenylbis(2,4,6-trimethylbenzoyl)phosphine oxide (DAIDO UV-CURE 819, manufactured by Daido Chemical Industry Co., Ltd.) and phenylbis(2,4,6-trimethylbenzoyl)phosphine oxide (Omnirad 819, manufactured by IGM Resins B.V.).

Phenylbis(2,4,6-trimethylbenzoyl)phosphine oxide (DAIDO UV-CURE 819, manufactured by Daido Chemical Industry Co., Ltd.) contains impurities having a retention time of 2.8 minutes and 5.4 minutes as measured by a high performance liquid chromatography.

The proportion of phenylbis(2,4,6-trimethylbenzoyl)phosphine oxide accounts for 0.1 to 2 percent by mass in the curable composition.

When the proportion of phenylbis(2,4,6-trimethylbenzoyl)phosphine oxide is from 0.1 to 2 percent by mass, a curable composition having excellent curability and a high level of discharging stability can be obtained if phenylbis(2,4,6-trimethylbenzoyl)phosphine oxide (DAIDO UV-CURE 819, manufactured by Daido Chemical Industry Co., Ltd.) is used.

In addition, a polymerization accelerator (sensitizer) can be optionally used together with the polymerization initiator.

The polymerization accelerator is not particularly limited.

Specific examples include, but are not limited to, amine compounds such as trimethyl amine, methyldimethanol amine, triethanol amine, p-diethylamino acetophenone, p-dimethylamino ethylbenzoate, p-dimethyl amino benzoate-2-ethylhexyl, N,N-dimthyl benzylamine, and 4,4'-bis(diethylamino)benzophenone.

The proportion of the polymerization accelerator is suitably determined to suit to a particular application depending on the identification and the amount of the polymerization initiator.

Coloring Material

The curable composition of the present disclosure may contain a coloring agent.

As the coloring agent, depending on the objectives and requisites of the composition in the present disclosure, various types of pigments and dyes can be used, which impart black, white, magenta, cyan, yellow, green, orange, and gloss color such as gold and silver.

The proportion of the coloring agent can be determined considering the desired color density, dispersibility of the coloring gent in the composition, etc. and is not particularly limited. Preferably, the proportion of the coloring agent to the total content of the curable composition is from 0.1 to 20 percent by mass. The curable composition of the present disclosure does not necessarily include a coloring material but can be clear and colorless.

If the curable composition contains no coloring material, the composition is suitable as an overcoat layer to protect images.

The pigment can be inorganic or organic and a combination thereof.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments condensed azo pigments, azo lakes, chelate azo pigments, etc.), polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates such as basic dye type chelates, acid dye type chelates, dye lakes such as basic dye type lake and acid dye type lake, nitro pigments, nitroso pigments, aniline black, and daylight fluorescent pigments.

In addition, a dispersant is optionally added to enhance the dispersibility of pigment. The dispersant has no particular limit. For example, it is suitable to use a polymer dispersant conventionally used to prepare a pigment dispersion.

The dyes include, for example, acidic dyes, direct dyes, reactive dyes, basic dyes, and combinations thereof.

Organic Solvent

The curable composition may include an organic solvent, but if possible, it is preferred that the composition be free of an organic solvent. The composition free of an organic solvent, in particular a volatile organic compound (VOC), is preferable because it enhances safeness at where the composition is handled so that pollution of the environment can be prevented. Incidentally, the organic solvent represents a conventional non-reactive organic solvent, for example, ether, ketone, xylene, ethylacetate, cyclohexanone, and toluene, which is clearly distinguished from reactive monomers. Furthermore, "free of" an organic solvent means that no organic solvent is substantially included. The proportion thereof is preferably less than 0.1 percent by mass.

Other Optional Components

The curable composition of the present disclosure may furthermore optionally include other components. The other components are not particularly limited and can be suitably selected to suit to a particular application. Examples include, but are not limited to, surfactants, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulator, and thickeners.

For each component in the curable composition, low molecular weight components such as a polymerizable monomer and a polymerization initiator can be identified by, for example, gas chromatography mass spectrometry. The polymer component is dissolved in a poor solvent such as methanol to precipitate for separation. The main skeleton and the proportion of the content of the chlorine atom can be identified by infrared spectroscopy or elemental analysis.

Preparation of Composition

The curable composition of the present disclosure can be prepared by using the components mentioned above. The preparation devices and conditions are not particularly limited. For example, the curable composition can be prepared by loading a polymerizable compound, a pigment, a dispersant, etc., into a dispersing machine such as a ball mill, a kitty mill, a disk mill, a pin mill, and a DYNO-MILL to prepare a pigment liquid dispersion followed by mixing with a polymerizable compound, a polymerization initiator, a polymerization inhibitor, and a surfactant.

Viscosity

The viscosity of the curable composition of the present disclosure has no particular limit and it can be adjusted to suit to a particular application and device. For example, if a discharging device that discharges the curable composition from nozzles is used, the viscosity thereof is 60 mPa·s or less, preferably in the range of from 3 to 40 mPa·s, more preferably from 5 to 30 mPa·s, furthermore preferably from 5 to 15 mPa·s, and particularly preferably from 6 to 12 mPa·s in the temperature range of from 20 to 65 degrees C., preferably at 25 degrees C.

In addition, it is particularly preferable to satisfy this viscosity range without including the organic solvent mentioned above. Viscosity can be measured by a cone-and-plate type rotary viscometer (VISCOMETER TVE-22L, manufactured by TOKI SANGYO CO., LTD.) using a cone rotor (1°34'×R24) at a rotational frequency of 50 rpm with a setting of the temperature of hemathermal circulating water in a range of from 20 to 65 degrees C. VISCOMATE VM-150III can be used for the temperature control of the circulating water.

Curing Device

The curing device that cures the curable composition of the present disclosure utilizes curing upon application of heat or active energy rays. Curing upon application of active energy rays is preferable.

The active energy rays for use in curing the curable composition are not particularly limited as long as they can apply energy to conduct polymerization reaction of the polymerizable components in the curable composition.

Specific examples include, but are not limited to, electron beams, α rays, β rays, γ rays, and X rays, in addition to ultraviolet rays. A particularly high energy light source obviates the need for a polymerization initiator to proceed polymerization reaction. In addition, in the case of irradiation of ultraviolet rays, mercury-free is strongly demanded in terms of protection of environment. Therefore, replacement with GaN-based ultraviolet light-emitting devices is greatly preferred from industrial and environmental point of view. Furthermore, ultraviolet ray light-emitting diode (UV-LED) and ultraviolet ray laser diode (UV-LD) are preferable.

Small size, long working life, high efficiency, and high cost performance thereof make such irradiation sources desirable as an ultraviolet light source. It is more preferable to use a light-emitting diode emitting light having a wavelength of from 350 to 450 nm, in particular, 350 nm to 400 nm.

Field of Application

The application field of the curable composition of the present disclosure is not particularly limited. It can be applied to any field where the active energy ray curable composition is used. For example, the curable composition is selected suit to a particular application and used for a resin for processing, a paint, an adhesive, an insulant, a releasing agent, a coating material, a sealing material, various resists, and various optical materials.

Figure 2:
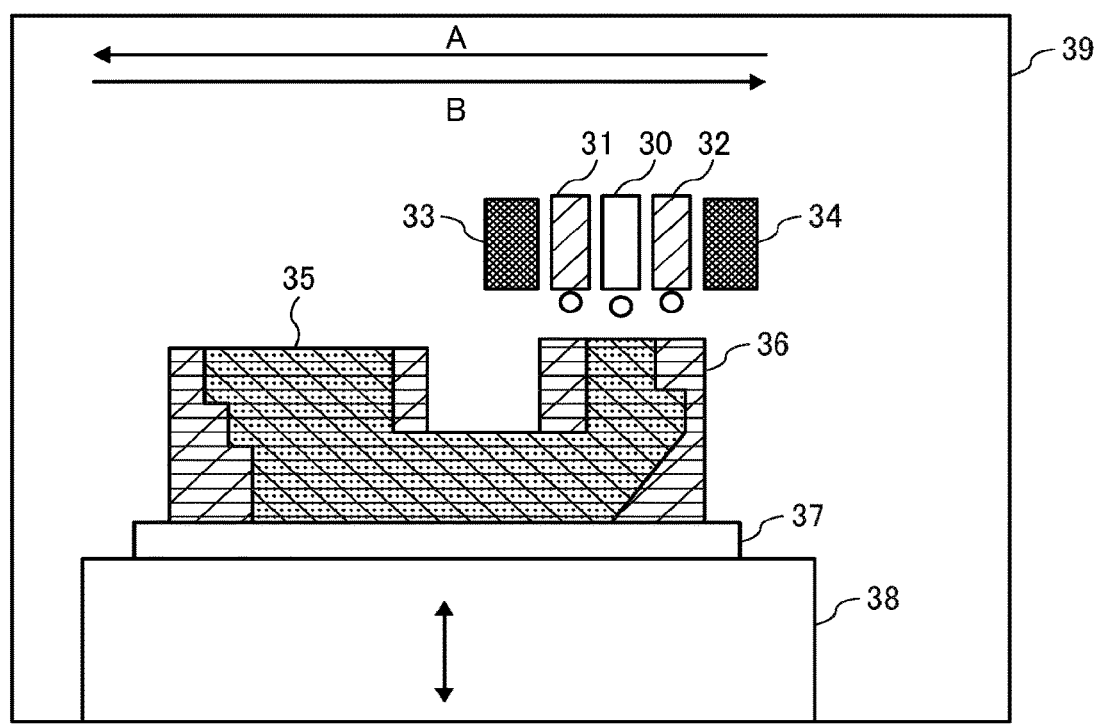
FIG. 2 is a schematic diagram illustrating an example of another image forming device (device for fabricating a three-dimensional image)
Figure 3A:
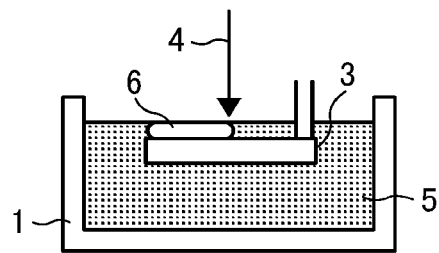
FIGS. 3A, 3B, 3C, and 3D are schematic explanatory diagrams illustrating an example of a method of solid free-form fabrication using a curable composition.
Figure 3B:
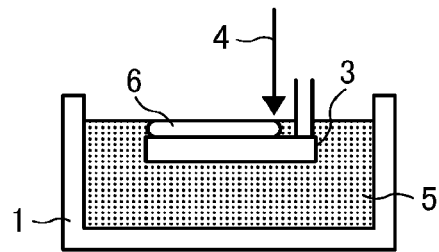
Figure 3C:
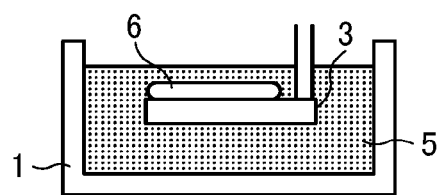
Figure 3D:
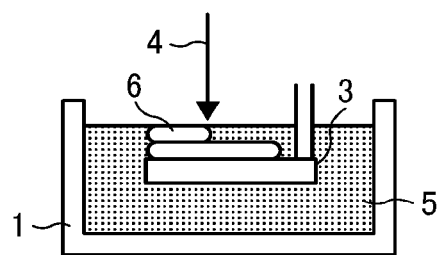

Furthermore, the curable composition of the present disclosure can be used as an ink to form two-dimensional texts, images, and designed coating film on various substrates and in addition a solid object forming material to form a three-dimensional image (solid freeform fabrication object). This material for a solid freeform fabrication can be used as a binder for powder particles for use in powder additive manufacturing to conduct solid freeform fabrication by repeating curing and laminating powder layers. Also, it can be used as a solid constituting material (modeling material) or supporting member (supporting material) for use in additive manufacturing (stereolithography) method as illustrated in FIG. 2 and FIGS. 3A to 3D. FIG. 2 is a diagram illustrating a method of discharging the active energy ray curable composition of the present disclosure to a particular area followed by curing upon irradiation of active energy rays to form a layer and laminating the layers (detail of which is described later).

FIGS. 3A to 3D are diagrams illustrating a method of irradiating a pool (accommodating unit) 1 of the active energy ray curable composition 5 of the present disclosure with active energy rays 4 to form a cured layer 6 having a particular form on a movable stage 3 and sequentially laminating the cured layer 6 so that a solid freeform fabrication object is obtained.

A device for fabricating a three-dimensional (solid) object by the curable liquid composition of the present disclosure can be a known device and is not particularly limited. For example, the device includes an accommodating device, a supplying device, and a discharging device (applying device) of the curable composition, an active energy ray irradiator (curing device), etc.

In addition, the present disclosure includes cured matter obtained by causing the curable liquid composition to cure and processed products obtained by processing structures having the cured matter formed on a substrate.

The cured matter or structure having a sheet-like form or film-like form is subject to molding process such as hot drawing and punching to obtain such a processed product. The processed product is preferably used for, for example, gauges or operation panels of vehicles, office machines, electric and electronic machines, and cameras, which require surface-processing after decorating the surface.

The substrate is not particularly limited. It can be suitably selected to suit to a particular application. Examples are paper, fiber, threads, fabrics, leather, metal, plastic, glass, wood, ceramics, or composite materials thereof. Of these, plastic substrates are preferred in terms of processability.

Accommodating Unit

The accommodating unit of the present disclosure means a container containing the curable composition of the present disclosure and is suitable for the applications as described above.

For example, if the curable composition of the present disclosure is used for ink, the accommodating unit containing the ink can be used as an ink cartridge or an ink bottle. Therefore, users can avoid direct contact with the ink during working such as transfer or replacement of the ink, so that fingers and clothes are prevented from getting dirty. Furthermore, inclusion of foreign matter such as dust in the ink can be prevented. In addition, the container can be of any size, any form, and any material. For example, the container can be designed for any particular purpose and usage. It is preferable to use a light blocking material to block the light or cover a container with a light blocking sheet, etc.

Image Forming Method and Image Forming Device

The image forming method (method of forming a two or three dimensional image) of the present disclosure may utilize active energy rays, heating, etc. The image forming method of the present disclosure includes at least irradiating the curable composition of the present disclosure with active energy rays to cure the curable composition. The image forming device (device for forming a two or three dimensional image) of the present disclosure includes an irradiator to irradiate the curable composition of the present disclosure with active energy rays and an accommodating unit containing the curable composition of the present disclosure. The accommodating unit may include the container mentioned above.

Furthermore, the method and the device may respectively include discharging the curable composition of the present disclosure and a discharging device (application device) to discharge the curable composition of the present disclosure. The method of discharging the curable composition is not particularly limited. Examples are a continuous spraying method and an on-demand method. The on-demand method includes a piezo method, a thermal method, an electrostatic method, etc.

FIG. 1 is a diagram illustrating an image forming device 20 including an inkjet discharging device. Printing units 23a, 23b, 23c, and 23d respectively having ink cartridges and discharging heads for yellow, magenta, cyan, and black active energy ray curable inks discharge the inks onto a recording medium 22 fed from a supplying roll 21. Thereafter, light sources 24a, 24b, 24c, and 24d emit active energy rays to the inks to cure the inks so that a color image is formed. Thereafter, a recording medium 22 is transferred (conveyed) to a processing unit 25 and a printed matter reeling roll 26. Each of the printing unit 23a, 23b, 23c, and 23d may include a heating assembly to liquidize the ink at the ink discharging unit. Moreover, a mechanism may be optionally disposed which cools down the recording medium to an ambient temperature in a contact or non-contact manner. In addition, the inkjet recording method may be either of a serial method of discharging an ink onto a recording medium by moving the head while the recording medium intermittently moves in accordance with the width of a discharging head or a line method of discharging an ink onto a recording medium from a discharging head held at a fixed position while continuously moving the recording medium.

The recording medium 22 is not particularly limited. Specific examples thereof include, but are not limited to, paper, film, metal, or complex materials thereof. The recording medium 22 takes a sheet-like form but is not limited thereto. The image forming device may have a simplex printing configuration capable of printing on one side of a recording medium or a duplex printing configuration capable of printing on both sides thereof.

Optionally, multiple colors can be printed with no or faint active energy rays from the light sources 24a, 24b, and 24c, followed by irradiation of the active energy rays by the light source 24d. This saves energy and cost.

The recorded matter on which images are printed with the ink of the present disclosure includes articles having images or texts on a plain surface of conventional paper, resin film, etc. a rough surface, or a surface made of various materials such as metal or ceramic. In addition, due to lamination of two dimensional images, it is possible to form an image partially with solid feeling (images with two dimension and three dimension) or a solid object.

FIG. 2 is a schematic diagram illustrating an example of the image forming device (device for fabricating a three-dimensional image) relating to the present disclosure. The image forming device 39 illustrated in FIG. 2 uses a head unit (movable in the AB direction) in which inkjet heads are arranged to discharge a first curable composition from a discharging head unit 30 for fabrication and discharge a second curable composition from discharging head units 31 and 32 for support and irradiate the applied first and second curable compositions with active energy rays emitted from ultraviolet irradiators 33 and 34 to solidify to form a first fabrication layer. This operation is repeated according to the number of laminations while moving a stage 38 movable up and down, thereby laminating support layers and fabrication layers to manufacture a solid freeform fabrication object 35 including a laminated support 36. Thereafter, the laminated support 36 is removed, if desired. The reference numeral 37 represents a support substrate for a fabrication object. Although there is only one of the discharging head unit 30 for fabrication illustrated in FIG. 2, the device may have two or more discharging head units 30.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

Examples

Next, the present disclosure is described in detail with reference to Examples but not limited thereto.

Preparation Example 1

Preparation of Cyan Pigment Liquid Dispersion 39.5 parts by mass of phenoxyethyl acrylate (manufactured by OSAKA ORGANIC CHEMICAL INDUSTRY LTD.), 1.5 parts by mass of a polymer pigment dispersant (DISPERBYK-168, manufactured by BYK), and 9.0 parts of cyan pigment (LIONOL BLUE FG-7330, manufactured by TOYOCOLOR Co., Ltd.) were stirred and mixed with a stirrer for one hour, followed by stirring with a bead mill for two hours to prepare a cyan pigment liquid dispersion. The solid content concentration of the cyan pigment in the obtained cyan pigment liquid dispersion was 18 percent by mass.

Preparation Example 2

Preparation of Magenta Pigment Liquid Dispersion 42.2 parts by mass of phenoxyethyl acrylate (manufactured by OSAKA ORGANIC CHEMICAL INDUSTRY LTD.), 1.8 parts by mass of polymer pigment dispersant (DISPERBYK-168, manufactured by BYK), and 6.0 parts by mass of magenta pigment (Cinquasia Pink K4410, manufactured by BASF SE) were stirred and mixed with a stirrer for one hour, followed by stirring with a bead mill for two hours to prepare a magenta particle liquid dispersion (B) (solid concentration of magenta pigment: 12 percent by mass).

Preparation Example 3

Preparation of Yellow Particle Liquid Dispersion 42.5 parts by mass of phenoxyethyl acrylate (manufactured by OSAKA ORGANIC CHEMICAL INDUSTRY LTD.), 2.8 parts by mass of polymer pigment dispersant (DISPERBYK-168, manufactured by BYK), and 6.0 parts by mass of yellow pigment (Pigment Yellow 155, manufactured by Clariant AG) were added and stirred for one hour with a stirrer, followed by stirring for two hours with a bead mill to prepare a yellow particle dispersion (C) (solid content of yellow pigment: 12 percent by mass).

Preparation Example 4

Preparation of Black Pigment Liquid Dispersion 37.5 parts by mass of phenoxyethyl acrylate (manufactured by OSAKA ORGANIC CHEMICAL INDUSTRY LTD.), 3.5 parts by mass of a polymer pigment dispersant (SOLSPERS 39000, manufactured by The Lubrizol Corporation), and 9.0 parts of black pigment (MA11, manufactured by Mitsubishi Chemical Corporation) were stirred and mixed with a stirrer for one hour, followed by stirring with a bead mill for two hours to prepare a black pigment liquid dispersion. The solid content concentration of the black pigment in the obtained black pigment liquid dispersion was 18 percent by mass.

Preparation Example 5

Preparation of White Pigment Liquid Dispersion 29 parts by mass of phenoxyethyl acrylate (manufactured by Osaka Organic Chemical Industry Co., Ltd.), 0.6 parts by mass of a polymer pigment dispersant (SOLSPERS 24000GR, manufactured by Lubrizol Co., Ltd.), a polymer pigment dispersant (AJISPER PB881, manufactured by AJI-NOMOTO Fine-Techno Co., Inc.), and 20.0 parts by mass of titanium oxide (Titanics JR-301, 3 percent by mass of silica, 1 percent by mass of alumina, manufactured by TAYCA CORPORATION) were stirred and mixed with a stirrer for one hour, followed by stirring for two hours with a bead mill to prepare a white pigment liquid dispersion. The solid content concentration of the white pigment in the obtained white pigment dispersion was 18 percent by mass.

Examples 1 to 12 and Comparative Examples 1 to 7

Each of the materials shown in Tables 1 to 4 was sequentially added during stirring and thereafter stirred for two hours to prepare curable compositions of Examples 1 to 12 and Comparative Examples 1 to 7.

Details of the materials used in Examples and Comparative Examples in Tables 1 to 4 are as follows.

Mono-Functional Monomer
Cyclic trimethyhlol propane formal acrylate (manufactured by OSAKA ORGANIC CHEMICAL INDUSTRY LTD.)
Isobornyl acrylate (manufactured by OSAKA ORGANIC CHEMICAL INDUSTRY LTD.)
Tetrahydrofurfuryl acrylate (manufactured by OSAKA ORGANIC CHEMICAL INDUSTRY LTD.)

Acryloylmorpholine (manufactured by Kohjin co., Ltd.)
Phenoxyethyl acrylate (manufactured by OSAKA ORGANIC CHEMICAL INDUSTRY LTD.)
Tricyclodecane dimethylol diacrylate (manufactured by Nippon Kayaku Co., Ltd.)
Tetrahydrofurfuryl acrylate (manufactured by OSAKA ORGANIC CHEMICAL INDUSTRY LTD.)
Dipropylene diglycol diacrylate (manufactured by Tokyo Chemical Industry Co., Ltd.)
N-Vinylcaprolactam (manufactured by Tokyo Chemical Industry Co., Ltd.)
Isodecyl acrylate (manufactured by OSAKA ORGANIC CHEMICAL INDUSTRY LTD.)
Hexamethylene diacrylate (manufactured by Tokyo Chemical Industry Co., Ltd.)
1,6-hexanediol diacrylate-2-aminoethanol polymer (manufactured by Sigma-Aldrich Co. LLC.)
Oligomer
CN966 (urethane acrylate oligomer, manufactured by Sartomer Company)
CN963J85 (urethane acrylate oligomer, manufactured by Sartomer Company)
Additive Agent
Hexadecyltrimethyl ammonium chloride (manufactured by Tokyo Chemical Industry Co., Ltd.)
Polymerization Inhibitor
4-methoxyphenol: Methoquinone (manufactured by Seiko Chemical Co., Ltd.)
Surfactant
Polyether-modified siloxane: TEGO WET270 (manufactured by Evonik Industries AG)
Photo Polymerization Initiator
Phenylbis(2,4,6-trimethylbenzoyl)phosphine oxide: DAIDO UV-CURE 819, manufactured by Daido Chemical Industry Co., Ltd.)
Phenylbis(2,4,6-trimethylbenzoyl)phosphine oxide: Omnirad 819 (manufactured by IGM Resins B.V.)
Diphenyl(2,4,6-trimethylbenzoyl)phosphine oxide (DAIDO UV-CURE TPO, manufactured by Daido Chemical Industry Co., Ltd.)
2,4-Diethylthioxanthone: KAYACURE-DETX (manufactured by Daido Chemical Co., Ltd.)
Benzoxazole derivative: Telalux KCB (manufactured by Clariant (Japan) K.K.)
Bis(2,4,6-trimethylbenzoyl)-phenylphosphine oxide (DAIDO UV-CURE 819, manufactured by Daido Chemical Industry Co., Ltd.) as a polymerization initiator was measured by using a semi-preparative HPLC system LC-2000Plus (manufactured by JASCO Corporation) with an analytical column of Shodex Silica C18M4E, 4.6 mm×250 mm, S-5 and a mobile phase of acetonitrile/ultrapure water=4:1, and a flow rate of 1.0 mL/min. As a result, it was confirmed that the peaks (impurities) were observed at the retention times of 2.8 min and 5.4 min.

Other polymerization initiators had no peaks at retention times of 2.8 min and 5.4 min.

Next, in Examples 1 to 12 and Comparative Examples 1 to 7, the absorbance at a wavelength of 700 nm of the supernatant after centrifugation of each of the prepared curable compositions was measured as follows. The results are shown in Tables 1 to 4.

Absorbance at Wavelength of 700 nm of Supernatant After Centrifuging Curable Composition Each of the thus-prepared curable compositions was centrifuged at 70,000 rpm for 30 minutes using a centrifuge (CP-100MX, manufactured by Hitachi Koki Co., Ltd.) to collect supernatant. The absorbance of the supernatant at a wavelength of 700 nm was measured using an absorbance meter (U-3900H, manufactured by Hitachi High-Tech Co., Ltd.). No practical problem occurs at an absorbance at a wavelength of 700 nm of 0.02 or less.

The curable compositions obtained in Examples 1 to 12 and Comparative Examples 1 to 7 were evaluated regarding discharging stability, image quality, curability, pencil hardness, and attachability as described below. The results are shown in Tables 1 to 4.

Discharging Stability

For each of the curable compositions, using an inkjet discharging device equipped with a GEN5 head (manufactured by Ricoh Printing Systems Co., Ltd.), continuous printing was conducted with a run length of 100 sheets with a one pass at a resolution of 600 dpi by a single pass printing method and the result was evaluated according to the following criteria. The rating A and above are allowable in terms of practical use.

Evaluation Criteria

S: No discharging disturbance or no non-discharging occurred at all
A: Discharging disturbance and non-discharging occurred for 10 or less nozzles
B: Discharging disturbance and non-discharging occurred for 30 or less nozzles
C: Discharging disturbance and non-discharging occurred for 50 or less nozzles Image Quality Each of the curable compositions was applied to a polycarbonate substrate (Iupilon® 100 FE 2000 masking, thickness of 100 μm, manufactured by Mitsubishi Engineering Plastics Co., Ltd.) using an inkjet discharging device equipped with a GEN5 head (manufactured by Ricoh Printing Systems Co., Ltd) in such a manner that the film thickness became 12 μm. The thus-obtained 24 hue chart film having a thickness of about 12 μm on the substrate was irradiated with active energy rays with an integrated light quantity of 500 mJ/cm$^2$ in a long wavelength region of 395 nm using an LED UV irradiator (LH6, manufactured by Fusion Systems Japan Co., Ltd.) to cure the film, thereby to obtain a cured product.

For the produced cured product, the Japan color volume coverage was calculated using a reflection type colorimeter (X-rite 939, manufactured by X-rite) and evaluated according to the following criteria. The rating A and above are allowable in terms of practical use.

Evaluation Criteria

S: Japan color volume coverage was 92 percent or more
A: Japan color volume coverage was from 85 to less than 92 percent
B: Japan color volume coverage was 80 to less than 85 percent
C: Japan color volume coverage was less than 80 percent Curability Each of the curable compositions was applied by a single pass printing method to a polycarbonate substrate (Iupilon® 100 FE 2000 masking, thickness of 100 μm, manufactured by Mitsubishi Engineering Plastics Co., Ltd.) using an inkjet discharging device equipped with a GEN5 head (manufactured by Ricoh Printing Systems Co., Ltd) in such a manner that the film thickness became 12 μm. The thus-obtained solid film having a thickness of about 12 μm on the substrate was irradiated with active energy rays with an integrated light quantity of 500 mJ/cm$^2$ in a long wavelength region of 395 nm using an LED UV irradiator (LH6, manufactured by Fusion Systems Japan Co., Ltd.) to cure the film, thereby to obtain a cured product. Thereafter, the curability of the obtained coating film surface was evaluated by palpation using a cotton swab according to the following criteria.

Evaluation Criteria

S: The coating film surface was not damaged
A: No damage on the coating film surface but slightly sticky causing no practical problem
B: The coating film surface was slightly damaged and sticky
C: The coating film surface was damaged and cured film was partially transferred to the hand.

Pencil Hardness

For each cured product prepared in the same manner as in the method of preparing a cured product in the above-described evaluation of curability, the pencil hardness was evaluated according to the pencil hardness test method (JIS K5600-5-4 format, scratch hardness (pencil method)) and the following criteria. The rating A and above are allowable in terms of practical use.

Evaluation Criteria

S: Pencil hardness was HB or higher
A: Pencil hardness was B to less than HB
B: Pencil hardness was 2B to less than B
C: Pencil hardness was 3B or less Attachability Each obtained cured product was evaluated according to the cross-cut test (old version) of JIS K 5400 format.

In addition, the numerical value of the attachability is defined as a ratio of not peeled-off area where 100 means that there is no peeling-off in the grid portion cut into 100 pieces and the adhesiveness of 80 means that the area of the non-peeled off portion is 80 percent.

Evaluation Criteria

S: Attachability was 100 and almost no peeling-off on the cut line
A: Attachability of 98 or more or slight peeling-off on the cut line, without causing a practical problem
B: Attachability of from 50 to less than 98
C: Attachability of less than 50

TABLE 1

|  |  | Example | | |
|---|---|---|---|---|
|  |  | 1 | 2 | 3 |
| Polymerizable monomer | Cyclic trimethyhlol propane formal acrylate: A | | | |
|  | Isobonyl acrylate | 20.0 | 20.0 | 20.0 |
|  | Tetrahydrofurfuryl acrylate | | | |
|  | Acryloylmorpholine: B | 7.5 | 7.5 | 7.5 |
|  | Phenoxyethyl acrylate: C | 34.3 | 33.4 | 34.3 |
|  | Tricyclodecane dimethylol diacrylate | 4.0 | 4.0 | 4.0 |
|  | Tetrahydrofurfuryl acrylate | | | |
|  | Dipropylene glycol diacrylate | | | |
|  | N-Vinylcaprolactam | | | |
|  | Isodecyl acrylate | | | |
|  | Hexamethylene diacrylate | | | |
|  | 1,6-hexanediol diacrylate-2-aminoethanol polymer | | | |
| Oligomer | CN966 | | | |
|  | CN963J85 | 9.0 | 9.0 | 9.0 |
| Polymerization inhibitor | 4-methoxyphenol | 0.2 | 0.2 | 0.2 |
| Surfactant | TEGO WET 270 | | | |
| Additive | Hexadecyl trimethyl ammonium chloride | | | |
| Polymerization initiator | Phenylbis(2,4,6-trimethylbenzoyl)phosphine oxide (DAIDO UV-CURE 819): X | 0.1 | 1.0 | |
|  | Phenylbis(2,4,6-trimethylbenzoyl)phosphine oxide (Omnirad 819): X | | | 0.1 |
|  | Diphenyl(2,4,6-trimethylbenzoyl)phosphine oxide (DAIDO UV-CURE TPO): Y | 10.0 | 10.0 | 10.0 |
|  | 2,4-Diethylthioxanthone | 1.0 | 1.0 | 1.0 |
|  | Benzoxazole derivative: Telalux KCB p | | | |
| Pigment liquid dispersion | Cyan pigment liquid dispersion | 13.9 | 13.9 | 13.9 |
|  | Magenta pigment liquid dispersion | | | |
|  | Yellow pigment liquid dispersion | | | |
|  | Black pigment liquid dispersion | | | |
|  | White pigment liquid dispersion | | | |
| Total (percent by mass) | | 100 | 100 | 100 |
| Mass ratio (X:Y) | | 1:100 | 1:10 | 1:100 |
| Proportion of polymerizable monomer (A + B + C) (percent by mass) | | 53.2 | 52.3 | 53.2 |
| Evaluation result | Discharging stability | S | S | S |
|  | Image quality | S | S | S |
|  | Curability | S | S | S |
|  | Pencil hardness | S | S | S |
|  | Attachability | S | S | S |
|  | Absorbance at wavelength of 700 nm of supernatant after centrifuging curable composition | 0.01 | 0.02 | 0.01 |

TABLE 1-continued

|  |  | Example | | |
|---|---|---|---|---|
|  |  | 4 | 5 | 6 |
| Polymerizable monomer | Cyclic trimethyhlol propane formal acrylate: A | 10.0 |  | 10.0 |
|  | Isobonyl acrylate | 5.0 | 32.0 | 15.0 |
|  | Tetrahydrofurfuryl acrylate |  |  |  |
|  | Acryloylmorpholine: B | 7.5 | 7.5 | 7.5 |
|  | Phenoxyethyl acrylate: C | 35.4 | 20.3 | 23.3 |
|  | Tricyclodecane dimethylol diacrylate | 4.0 | 6.0 | 4.0 |
|  | Tetrahydrofurfuryl acrylate |  |  |  |
|  | Dipropylene glycol diacrylate |  |  |  |
|  | N-Vinylcaprolactam |  |  |  |
|  | Isodecyl acrylate |  |  |  |
|  | Hexamethylene diacrylate |  |  |  |
|  | 1,6-hexanediol diacrylate-2-aminoethanol polymer |  |  |  |
| Oligomer | CN966 |  |  |  |
|  | CN963J85 | 9.0 | 9.0 | 9.0 |
| Polymerization inhibitor | 4-methoxyphenol | 0.2 | 0.2 | 0.2 |
| Surfactant | TEGO WET 270 |  |  |  |
| Additive | Hexadecyl trimethyl ammonium chloride |  |  |  |
| Polymerization initiator | Phenylbis(2,4,6-trimethylbenzoyl)phosphine oxide (DAIDO UV-CURE 819): X | 2.0 | 0.1 | 0.1 |
|  | Phenylbis(2,4,6-trimethylbenzoyl)phosphine oxide (Omnirad 819): X |  |  |  |
|  | Diphenyl(2,4,6-trimethylbenzoyl)phosphine oxide (DAIDO UV-CURE TPO): Y | 12.0 | 10.0 | 16.0 |
|  | 2,4-Diethylthioxanthone | 1.0 | 1.0 | 1.0 |
|  | Benzoxazole derivative: Telalux KCB p |  |  |  |
| Pigment liquid dispersion | Cyan pigment liquid dispersion | 13.9 | 13.9 | 13.9 |
|  | Magenta pigment liquid dispersion |  |  |  |
|  | Yellow pigment liquid dispersion |  |  |  |
|  | Black pigment liquid dispersion |  |  |  |
|  | White pigment liquid dispersion |  |  |  |
| Total (percent by mass) |  | 100 | 100 | 100 |
| Mass ratio (X:Y) |  | 1:6 | 1:100 | 1:160 |
| Proportion of polymerizable monomer (A + B + C) (percent by mass) |  | 64.3 | 39.2 | 52.2 |
| Evaluation result | Discharging stability | A | A | A |
|  | Image quality | S | S | S |
|  | Curability | S | S | S |
|  | Pencil hardness | S | S | S |
|  | Attachability | S | A | S |
|  | Absorbance at wavelength of 700 nm of supernatant after centrifuging curable composition | 0.02 | 0.02 | 0.01 |

TABLE 2

|  |  | Example | | |
|---|---|---|---|---|
|  |  | 7 | 8 | 9 |
| Polymerizable monomer | Cyclic trimethyhlol propane formal acrylate: A |  | 12.0 | 12.0 |
|  | Isobonyl acrylate | 20.0 | 1.0 | 5.0 |
|  | Tetrahydrofurfuryl acrylate |  |  |  |
|  | Acryloylmorpholine: B | 7.5 | 5.0 | 5.0 |
|  | Phenoxyethyl acrylate: C | 36.4 | 32.4 | 27.3 |
|  | Tricyclodecane dimethylol diacrylate | 4.0 | 4.0 | 4.0 |
|  | Tetrahydrofurfuryl acrylate |  |  |  |
|  | Dipropylene glycol diacrylate |  |  |  |
|  | N-Vinylcaprolactam |  |  |  |
|  | Isodecyl acrylate |  |  |  |
|  | Hexamethylene diacrylate |  |  |  |
|  | 1,6-hexanediol diacrylate-2-aminoethanol polymer |  |  |  |
| Oligomer | CN966 |  |  |  |
|  | CN963J85 | 9.0 | 1.0 | 3.0 |

TABLE 2-continued

|  |  | | | |
|---|---|---|---|---|
| Polymerization inhibitor | 4-methoxyphenol | 0.2 | 0.2 | 0.2 |
| Surfactant | TEGO WET 270 | | | |
| Additive | Hexadecyl trimethyl ammonium chloride | | | |
| Polymerization initiator | Phenylbis(2,4,6-trimethylbenzoyl)phosphine oxide (DAIDO UV-CURE 819): X | 1.0 | 0.1 | 0.5 |
| | Phenylbis(2,4,6-trimethylbenzoyl)phosphine oxide (Omnirad 819): X | | | |
| | Diphenyl(2,4,6-trimethylbenzoyl)phosphine oxide (DAIDO UV-CURE TPO): Y | 7.0 | 10.0 | 12.0 |
| | 2,4-diethylthioxanthone | 1.0 | 1.0 | 1.0 |
| | Benzoxazole derivative: Telalux KCB p | | | |
| Pigment liquid dispersion | Cyan pigment liquid dispersion | 13.9 | | |
| | Magenta pigment liquid dispersion | | 33.3 | |
| | Yellow pigment liquid dispersion | | | 30.0 |
| | Black pigment liquid dispersion | | | |
| | White pigment liquid dispersion | | | |
| Total (percent by mass) | | 100 | 100 | 100 |
| Mass ratio (X:Y) | | 1:7 | 1:100 | 1:24 |
| Proportion of polymerizable monomer (A + B + C) (percent by mass) | | 55.3 | 78.7 | 70.7 |
| Evaluation result | Discharging stability | S | S | S |
| | Image quality | S | S | S |
| | Curability | A | S | S |
| | Pencil hardness | A | S | S |
| | Attachability | S | S | S |
| | Absorbance at wavelength of 700 nm of supernatant after centrifuging curable composition | 0.01 | 0.01 | 0.01 |

|  |  | Example | | |
|---|---|---|---|---|
|  |  | 10 | 11 | 12 |
| Polymerizable monomer | Cyclic trimethyhlol propane formal acrylate: A | 35.0 | | 12.0 |
| | Isobonyl acrylate | 7.5 | 20.0 | 20.0 |
| | Tetrahydrofurfuryl acrylate | | | |
| | Acryloylmorpholine: B | | 5.0 | 10.0 |
| | Phenoxyethyl acrylate: C | 13.5 | 17.5 | 39.6 |
| | Tricyclodecane dimethylol diacrylate | 9.0 | 4.0 | 2.0 |
| | Tetrahydrofurfuryl acrylate | | | |
| | Dipropylene glycol diacrylate | | | |
| | N-Vinylcaprolactam | | | |
| | Isodecyl acrylate | | | |
| | Hexamethylene diacrylate | | | |
| | 1,6-hexanediol diacrylate-2-aminoethanol polymer | | | |
| Oligomer | CN966 | | | |
| | CN963J85 | 3.0 | 5.0 | 9.0 |
| Polymerization inhibitor | 4-methoxyphenol | 0.2 | 0.2 | 0.2 |
| Surfactant | TEGO WET 270 | | | 0.1 |
| Additive | Hexadecyl trimethyl ammonium chloride | | | |
| Polymerization initiator | Phenylbis(2,4,6-trimethylbenzoyl)phosphine oxide (DAIDO UV-CURE 819): X | 0.1 | 1.0 | 1.0 |
| | Phenylbis(2,4,6-trimethylbenzoyl)phosphine oxide (Omnirad 819): X | | | |
| | Diphenyl(2,4,6-trimethylbenzoyl)phosphine oxide (DAIDO UV-CURE TPO): Y | 12.0 | 6.0 | 6.0 |
| | 2,4-diethylthioxanthone | 3.0 | | |
| | Benzoxazole derivative: Telalux KCB p | | | 0.2 |
| Pigment liquid dispersion | Cyan pigment liquid dispersion | | | |
| | Magenta pigment liquid dispersion | | | |
| | Yellow pigment liquid dispersion | | | |
| | Black pigment liquid dispersion | 16.7 | | |
| | White pigment liquid dispersion | | 41.3 | |
| Total (percent by mass) | | 100 | 100 | 100 |
| Mass ratio (X:Y) | | 1:120 | 1:6 | 1:6 |

TABLE 2-continued

| | | | | |
|---|---|---|---|---|
| Proportion of polymerizable monomer (A + B + C) (percent by mass) | | 62.2 | 47.3 | 61.6 |
| Evaluation result | Discharging stability | S | S | S |
| | Image quality | S | S | S |
| | Curability | S | A | A |
| | Pencil hardness | S | S | S |
| | Attachability | S | S | S |
| | Absorbance at wavelength of 700 nm of supernatant after centrifuging curable composition | 0.01 | 0.01 | 0.01 |

TABLE 3

| | | Comparative Example | | | |
|---|---|---|---|---|---|
| | | 1 | 2 | 3 | 4 |
| Polymerizable monomer | Cyclic trimethyhlol propane formal acrylate: A | 15.0 | | | |
| | Isobonyl acrylate | 15.0 | 20.0 | 20.0 | 20.0 |
| | Tetrahydrofurfuryl acrylate | | | | |
| | Acryloylmorpholine: B | 10.0 | 7.5 | 7.5 | 7.5 |
| | Phenoxyethyl acrylate: C | 34.9 | 32.4 | 31.4 | 27.3 |
| | Tricyclodecane dimethylol diacrylate | | 4.0 | 4.0 | 4.0 |
| | Tetrahydrofurfuryl acrylate | | | | |
| | Dipropylene glycol diacrylate | | | | |
| | N-Vinylcaprolactam | | | | |
| | Isodecyl acrylate | | | | |
| | Hexamethylene diacrylate | | | | |
| | 1,6-hexanediol diacrylate-2-aminoethanol polymer | | | | |
| Oligomer | CN966 | 2.0 | | | |
| | CN963J85 | | 9.0 | 9.0 | 9.0 |
| Polymerization inhibitor | 4-methoxyphenol | 0.2 | 0.2 | 0.2 | 0.2 |
| Surfactant | TEGO WET 270 | | | | |
| Additive | Hexadecyl trimethyl ammonium chloride | | | | |
| Polymerization initiator | Phenylbis(2,4,6-trimethylbenzoyl)phosphine oxide (DAIDO UV-CURE 819): X | 3.0 | 2.0 | 3.0 | 0.1 |
| | Phenylbis(2,4,6-trimethylbenzoyl)phosphine oxide (Omnirad 819): X | | | | |
| | Diphenyl(2,4,6-trimethylbenzoyl)phosphine oxide (DAIDO UV-CURE TPO): Y | 5.0 | 10.0 | 10.0 | 17.0 |
| | 2,4-diethylthioxanthone | 1.0 | 1.0 | 1.0 | 1.0 |
| | Benzoxazole derivative: Telalux KCB p | | | | |
| Pigment liquid dispersion | Cyan pigment liquid dispersion | 13.9 | 13.9 | 13.9 | 13.9 |
| | Magenta pigment liquid dispersion | | | | |
| | Yellow pigment liquid dispersion | | | | |
| | Black pigment liquid dispersion | | | | |
| | White pigment liquid dispersion | | | | |
| Total (percent by mass) | | 100 | 100 | 100 | 100 |
| Mass ratio (X:Y) | | 1:1.7 | 1:5 | 1:3.3 | 1:170 |
| Proportion of polymerizable monomer (A + B + C) (percent by mass) | | 59.9 | 51.3 | 50.3 | 46.2 |
| Evaluation result | Discharging stability | C | B | C | B |
| | Image quality | A | S | S | S |
| | Curability | C | S | S | S |
| | Pencil hardness | A | S | S | S |
| | Attachability | S | S | S | S |
| | Absorbance at wavelength of 700 nm of supernatant after centrifuging curable composition | 0.05 | 0.03 | 0.05 | 0.03 |

TABLE 4

|  |  | Comparative Example | | |
|---|---|---|---|---|
|  |  | 5 | 6 | 7 |
| Polymerizable monomer | Cyclic trimethyhlol propane formal acrylate: A | | | |
|  | Isobonyl acrylate | 20.0 | 20.0 | 13.0 |
|  | Tetrahydrofurfuryl acrylate | | | 10.0 |
|  | Acryloylmorpholine: B | 7.5 | 7.5 | |
|  | Phenoxyethyl acrylate: C | 34.4 | 43.4 | 16.9 |
|  | Tricyclodecane dimethylol diacrylate | 4.0 | 4.0 | |
|  | Tetrahydrofurfuryl acrylate | | | 14.0 |
|  | Dipropylene glycol diacrylate | | | 10.0 |
|  | N-Vinylcaprolactam | | | 10.0 |
|  | Isodecyl acrylate | | | 2.5 |
|  | Hexamethylene diacrylate | | | 0.5 |
|  | 1,6-Hexanedioldiacrylate-2-aminoethanol polymer | | | 5.0 |
| Oligomer | CN966 | | | |
|  | CN963J85 | 9.0 | 9.0 | |
| Polymerization inhibitor | 4-Methoxyphenol | 0.2 | 0.2 | 0.2 |
| Surfactant | TEGO WET 270 | | | |
| Additive | Hexadecyl trimethyl ammonium chloride | | | 1.0 |
| Polymerization initiator | Phenylbis(2,4,6-trimethylbenzoyl)phosphine oxide (DAIDO UV-CURE 819): X | | 1.0 | |
|  | Phenylbis(2,4,6-trimethylbenzoyl)phosphine oxide (Omnirad 819): X | | | |
|  | Diphenyl(2,4,6-trimethylbenzoyl)phosphine oxide (DAIDO UV-CURE TPO): Y | 10.0 | | 3.0 |
|  | 2,4-diethylthioxanthone | 1.0 | 1.0 | |
|  | Benzoxazole derivative: Telalux KCB p | | | |
| Pigment liquid dispersion | Cyan pigment liquid dispersion | 13.9 | 13.9 | 13.9 |
|  | Magenta pigment liquid dispersion | | | |
|  | Yellow pigment liquid dispersion | | | |
|  | Black pigment liquid dispersion | | | |
|  | White pigment liquid dispersion | | | |
| Total (percent by mass) | | 100 | 100 | 100 |
| Mass ratio (X:Y) | | 0 | 0 | 0 |
| Proportion of polymerizable monomer (A + B + C) (percent by mass) | | 53.3 | 62.3 | 16.9 |
| Evaluation result | Discharging stability | S | S | S |
|  | Image quality | S | A | A |
|  | Curability | C | C | A |
|  | Pencil hardness | S | B | A |
|  | Attachability | S | A | C |
|  | Absorbance at wavelength of 700 nm of supernatant after centrifuging curable composition | 0.01 | 0.01 | 0.01 |

Aspects of the present disclosure are, for example, as follows.

1. A curable composition includes a polymerizable compound and a polymerization initiator containing pheylbis(2,4,6-trimethyl benzoyl)phosphine oxide and diphenyl(2,4,6-trimethylbenzoyl)phosphine oxide in a mass ratio of pheylbis(2,4,6-trimethyl benzoyl)phosphine oxide:diphenyl(2,4,6-trimethylbenzoyl)phosphine oxide from 1:6 to 1:160, wherein supernatant obtained after the curable composition is centrifuged for 30 minutes at 70,000 rotation per minute has a absorbance of 0.02 or less at a wavelength of 700 nm.

2. The curable composition according to 1 mentioned above, wherein phenylbis(2,4,6-trimethylbenzoyl)phosphine oxide contains impurities having a retention time of 2.8 minutes and 5.4 minutes as measured by a high performance liquid chromatography.

3. The curable composition according to 1 or 2 mentioned above, wherein phenylbis(2,4,6-trimethylbenzoyl)phosphine oxide accounts for 0.1 to 2.0 percent by mass in the curable composition.

4. The curable composition according to any one of 1 to 3 mentioned above, wherein the polymerizable compound contains at least one of a monofunctional monomer and a polyfunctional monomer.

5. The curable compound according to any one of 1 to 4 mentioned above, wherein the polymerizable compound contains at least one member selected from (meth)acryloylmorpholine, cyclic trimethylolpropaneformal (meth)acrylate, and phenoxyethyl (meth)acrylate in an amount of 40 percent by mass or more.

6. The curable composition according to any one of 1 to 5 mentioned above, further contains a polymerizable oligomer having an ethylenically unsaturated double bond.

7. The curable composition according to any one of 1 to 6 mentioned above, further contains a coloring material.

8. The curable composition according to any one of 1 to 7 mentioned above, wherein the curable composition is an active energy ray curable composition.

9. The curable composition according to any one of 1 to 8 mentioned above for inkjet.

10. An accommodating unit includes a container accommodating the curable composition of any one of 1 to 9 mentioned above.

11. A device for forming a two or three dimensional image includes an accommodating unit configured to accommodate the curable composition of any one of 1 to 9 mentioned above, an application device configured to apply the curable composition, and a curing device configured to cure the curable composition.

12. The device according to 11 mentioned above, wherein the curing device includes a light-emitting diode.

13. A method of forming a two or three dimensional image, includes applying the curable composition of any one of 1 to 9 mentioned above and curing the curable composition.

14. The method according to 13 mentioned above, wherein a light-emitting diode light source emits light in the curing.

15. Cured matter formed by using the curable composition according to any one of 1 to 9 mentioned above.

16. A processed product manufactured by drawing the cured matter of 15 mentioned above.

17. A decorated object having a substrate the surface of which is treated with surface decoration formed of the cured matter of 15 mentioned above.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A curable composition, comprising:
   a polymerizable compound; and
   a polymerization initiator comprising phenylbis(2,4,6-trimethyl benzoyl)phosphine oxide and diphenyl(2,4,6-trimethylbenzoyl)phosphine oxide in a mass ratio of phenylbis(2,4,6-trimethyl benzoyl)phosphine oxide:diphenyl(2,4,6-trimethylbenzoyl)phosphine oxide from 1:6 to 1:160,
   wherein supernatant obtained after the curable composition is centrifuged for 30 minutes at 70,000 rotation per minute has an absorbance of 0.02 or less at a wavelength of 700 nm.

2. The curable composition according to claim 1, wherein phenylbis(2,4,6-trimethylbenzoyl)phosphine oxide contains impurities having a retention time of 2.8 minutes and 5.4 minutes as measured by a high performance liquid chromatography.

3. The curable composition according to claim 1, wherein phenylbis(2,4,6-trimethylbenzoyl)phosphine oxide accounts for 0.1 to 2 percent by mass in the curable composition.

4. The curable composition according to claim 1, wherein the polymerizable compound comprises at least one of a monofunctional monomer and a polyfunctional monomer.

5. The curable compound according to claim 1, wherein the polymerizable compound comprises at least one member selected from the group consisting of (meth)acryloylmorpholine, cyclic trimethylolpropane formal (meth)acrylate, and phenoxyethyl (meth)acrylate in an amount of 40 percent by mass or more.

6. The curable composition according to claim 1, further comprising a polymerizable oligomer having an ethylenically unsaturated double bond.

7. The curable composition according to claim 1, further comprising a coloring material.

8. The curable composition according to claim 1, being an active energy ray curable composition.

9. The curable composition according to claim 1, for inkjet.

10. An accommodating unit, comprising:
    a container accommodating the curable composition of claim 1.

11. A device for forming a two or three dimensional image, comprising:
    an accommodating unit accommodating the curable composition of claim 1;
    an application device configured to apply the curable composition; and
    a curing device configured to cure the curable composition.

12. The device according to claim 11, wherein the curing device includes a light-emitting diode.

13. A method of forming a two or three dimensional image, comprising: applying the curable composition of claim 1; and
    curing the curable composition.

14. The method according to claim 13, wherein the curing includes emitting light using a light-emitting diode light source.

15. Cured matter, formed by using the curable composition of claim 1.

* * * * *